United States Patent
Teeter et al.

(10) Patent No.: US 12,293,491 B2
(45) Date of Patent: May 6, 2025

(54) AUTOMATED PANORAMIC IMAGE CONNECTION FOR AUTOPLAY WITH TRANSITIONS

(71) Applicant: Threshold 360, Inc., Tampa, FL (US)

(72) Inventors: Brian Teeter, Tampa, FL (US); Sean Kovacs, Tampa, FL (US); Joshua Paine, Tampa, FL (US); Ben Griffin, Tampa, FL (US); Will Barrett, Tampa, FL (US); Ben Robbins, Tampa, FL (US); Jordan Raynor, Tampa, FL (US)

(73) Assignee: Threshold 360, Inc.

( * ) Notice: Subject to any disclaimer, the term of this patent is extended or adjusted under 35 U.S.C. 154(b) by 203 days.

(21) Appl. No.: 17/990,523

(22) Filed: Nov. 18, 2022

(65) Prior Publication Data

US 2023/0162327 A1   May 25, 2023

Related U.S. Application Data

(60) Provisional application No. 63/281,125, filed on Nov. 19, 2021.

(51) Int. Cl.
*G06T 5/70*    (2024.01)
*G06T 3/16*    (2024.01)
(Continued)

(52) U.S. Cl.
CPC .................. *G06T 5/70* (2024.01); *G06T 3/16* (2024.01); *G06T 5/50* (2013.01); *G06T 13/80* (2013.01);
(Continued)

(58) Field of Classification Search
CPC ....... G06T 2207/10016; G06T 2200/24; G06T 5/70; G06T 3/16; G06T 5/50; G06T 13/80; G06F 3/048–04897
See application file for complete search history.

(56) References Cited

U.S. PATENT DOCUMENTS

| 2003/0063133 A1* | 4/2003 | Foote .................... G06F 16/29 715/850 |
| 2007/0110338 A1* | 5/2007 | Snavely ................. G06F 16/22 382/190 |

(Continued)

FOREIGN PATENT DOCUMENTS

| CN | 110858409 A * | 3/2020 | ............. G06T 13/40 |
| CN | 111145358 A * | 5/2020 | ............ G06T 19/006 |

*Primary Examiner* — Peter Hoang
(74) *Attorney, Agent, or Firm* — FOLEY & LARDNER LLP

(57) ABSTRACT

Connecting images to generate a virtual tour is provided. The system receives images and metadata captured by a first client device, and detects features of the images to establish an order. The system identifies, based at least in part on the images and the metadata, a position for a virtual camera. The system connects, in the order, the images with the position of the virtual camera persisting across the images. The system generates a virtual tour from the connected images with a linear path along the persistent position of the virtual camera based on a configuration file comprising a constraint configured to disable branching along the linear path. The system delivers a viewer application that executes in a client application on a second client device. The system streams, to the viewer application, the virtual tour based at least in part on the configuration file.

18 Claims, 8 Drawing Sheets

(51) Int. Cl.
*G06T 5/50* (2006.01)
*G06T 13/80* (2011.01)

(52) U.S. Cl.
CPC ............... *G06T 2200/24* (2013.01); *G06T 2207/10016* (2013.01)

(56) References Cited

U.S. PATENT DOCUMENTS

2011/0200304 A1* 8/2011 Rutledge .......... H04N 21/44204
  386/248
2012/0099804 A1* 4/2012 Aguilera ............... G06F 16/954
  382/285
2016/0005229 A1* 1/2016 Lee ......................... G06T 11/60
  345/419

* cited by examiner

AUTOMATED PANORAMIC IMAGE CONNECTION FOR AUTOPLAY WITH TRANSITIONS

CROSS-REFERENCES TO RELATED APPLICATIONS

This application claims the benefit of priority under 35 U.S.C. § 119 to U.S. Provisional Patent Application No. 63/281,125, filed Nov. 19, 2021, which is hereby incorporated by reference herein in its entirety.

FIELD OF THE DISCLOSURE

This disclosure generally relates to automatically connecting panoramic images to provide automatic play functionality with one or more transitions.

BACKGROUND OF THE DISCLOSURE

A camera can provide separate images or videos of a location, such as the inside or outside of a building or other area. The separate images or video can be connected to generate a virtual tour. However, due to constraints associated with a camera path that can give rise to discrepancies between different images taken at different points within the location, it can be challenging to playback the images in a smooth and consistent manner without introducing lags, jumps, or other undesired artifacts.

SUMMARY OF THE DISCLOSURE

Systems and methods of this technical solution are generally directed to automatically connecting panoramic images to provide automatic play functionality with one or more transitions. This technical solution can automatically associate a visual position and direction between correlative panoramic images or video media to generate a smooth, seamless camera path between the different panoramic images. The technical solution can use the generated camera path to provide a virtual tour. Thus, this technical solution can connect independent panoramic images (or video media) into a cohesive experience that is based on a cohesive set of rules. The connected independent panoramic images can be provided to a viewer application for rendering or playback to a user.

The technical solution an include a system configured with technical rules and logic to provide bidirectional camera movement with specific constraints that allow for only forwards or backwards movement along the camera path (e.g., a linear path), thereby disabling branching off the camera path. By disabling or preventing branching along the camera path, the system can reduce excess computing resource utilization, while providing a smooth transition between panoramic images (or video) during the virtual tour. The system can be configured with rules and logic to control the speed of the playback and transition throughout the virtual tour. For example, the system can maintain a constant speed of playback and transition throughout the virtual tour. In some cases, the system can allow a user to set the speed of the playback in a configuration file, and then render the virtual tour using the constant speed set by the user.

The viewer application rendering the virtual tour can present graphical user elements along with the playback. For example, the viewer application can provide chevron style graphical user elements that a user can select or otherwise interact with in order to control one or more aspects of the virtual tour. The system (e.g., the viewer application or via the viewer application), can be configured to receive, intercept or detect user input during the virtual tour. The system can be configured with an interrupt detection component that can detect the user input and identify a command or instruction to engage or interact with a component of the virtual tour. For example, the system can allow for dynamic interaction or manipulation of a 360 degree scene or image, or allow for stepping forward or backward through the virtual tour. To reduce user input requests or prompts, the system can be configured with a timer or counter to automatically resume the virtual tour with the predetermined constant speed responsive to detecting a condition or event, such as the user being idle or unengaged for more than 10 seconds.

At least one aspect is directed to a system. The system can include a data processing system comprising one or more processors and memory. The data processing system can receive a plurality of images and metadata captured by a first client device. The data processing system can detect one or more features of the plurality of images to establish an order between the plurality of images. The data processing system can identify, based at least in part on the plurality of images and the metadata, a position for a virtual camera. The data processing system can connect, in the order, the plurality of images with the position of the virtual camera persisting across the plurality of images. The data processing system can generate a virtual tour from the connected plurality of images with a linear path along the persistent position of the virtual camera based on a configuration file comprising a constraint configured to disable branching along the linear path. The data processing system can deliver, responsive to a request from a second client device different from the first client device, a viewer application that executes in a client application on the second client device. The data processing system can stream, to the viewer application, the virtual tour based at least in part on the configuration file to cause the viewer application to automatically initiate playback of the virtual tour upon receipt of the streamed virtual tour.

In some embodiments, the plurality of images are panoramic images with a field of view greater than or equal to 160 degrees. The data processing system can iterate through the plurality of images to surface datasets from image-level noise. The data processing system can generate intermediate frames between at least two surfaced datasets corresponding to at least two of the plurality of images using a tweened animation curve configured to preserve spatial orientation relative to a virtual camera. The data processing system can generate the virtual tour comprising the intermediate frames configured to provide smooth transitioning across the virtual tour.

The data processing system can detect the one or more features based at least one of a scale-invariant feature transform ("SIFT"), speeded up robust features ("SURF"), AKAZE, or BRISK.

The data processing system can detect a bearing of a first image of the plurality of images based on a registration as identified by a second image of the plurality of images. The data processing system can establish a direction of travel along the linear path for the virtual tour based on the bearing. The data processing system can determine the bearing based on the second image via a pose extraction technique configured to fade the first image with the second image.

The data processing system can generate the virtual tour with a constant speed of playback based on a parameter in the configuration file. The data processing system can configure the viewer application to detect input via a user interface of the second client device to adjust playback of the virtual tour. The viewer application can prevent, based on the constraint, the input from adjusting playback of the virtual tour.

The data processing system can configure the viewer application to detect a request received via a user interface of the second client device to pause playback of the virtual tour. The viewer application can initiate, responsive to the request, a countdown timer for a predetermined time interval established in the configuration file. The viewer application can resume playback of the virtual tour responsive to expiration of the countdown timer.

The data processing system can receive, from the viewer application, a request to pause playback of the virtual tour and provide a 360 degree scene, wherein the request to pause playback initiate a countdown timer for a predetermined time interval. The data processing system can provide, to the viewer application responsive to the request, one or more images to provide the 360 degree scene, wherein the viewer application automatically resumes playback of the virtual tour responsive to expiration of the countdown timer.

At least one aspect is directed to a method. The method can be performed by a data processing system comprising one or more processors and memory. The method can include the data processing system receiving a plurality of images and metadata captured by a first client device. The method can include the data processing system detecting one or more features of the plurality of images to establish an order between the plurality of images. The method can include the data processing system identifying, based at least in part on the plurality of images and the metadata, a position for a virtual camera. The method can include the data processing system connecting, in the order, the plurality of images with the position of the virtual camera persisting across the plurality of images. The method can include the data processing system generating a virtual tour from the connected plurality of images with a linear path along the persistent position of the virtual camera based on a configuration file comprising a constraint configured to disable branching along the linear path. The method can include the data processing system delivering, responsive to a request from a second client device different from the first client device, a viewer application that executes in a client application on the second client device. The method can include the data processing system streaming, to the viewer application, the virtual tour based at least in part on the configuration file to cause the viewer application to automatically initiate playback of the virtual tour upon receipt of the streamed virtual tour.

At least one aspect is directed to a non-transitory computer readable comprising processor executable instructions that, when executed by one or more processors, cause the one or more processors to receive a plurality of images and metadata captured by a first client device. The instructions can include instructions to detect one or more features of the plurality of images to establish an order between the plurality of images. The instructions can include instructions to identify, based at least in part on the plurality of images and the metadata, a position for a virtual camera. The instructions can include instructions to connect, in the order, the plurality of images with the position of the virtual camera persisting across the plurality of images. The instructions can include instructions to generate a virtual tour from the connected plurality of images with a linear path along the persistent position of the virtual camera based on a configuration file comprising a constraint configured to disable branching along the linear path. The instructions can include instructions to deliver, responsive to a request from a second client device different from the first client device, a viewer application that executes in a client application on the second client device. The instructions can include instructions to stream, to the viewer application, the virtual tour based at least in part on the configuration file to cause the viewer application to automatically initiate playback of the virtual tour upon receipt of the streamed virtual tour.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims

DETAILED DESCRIPTION OF THE DISCLOSURE

Figure 1:
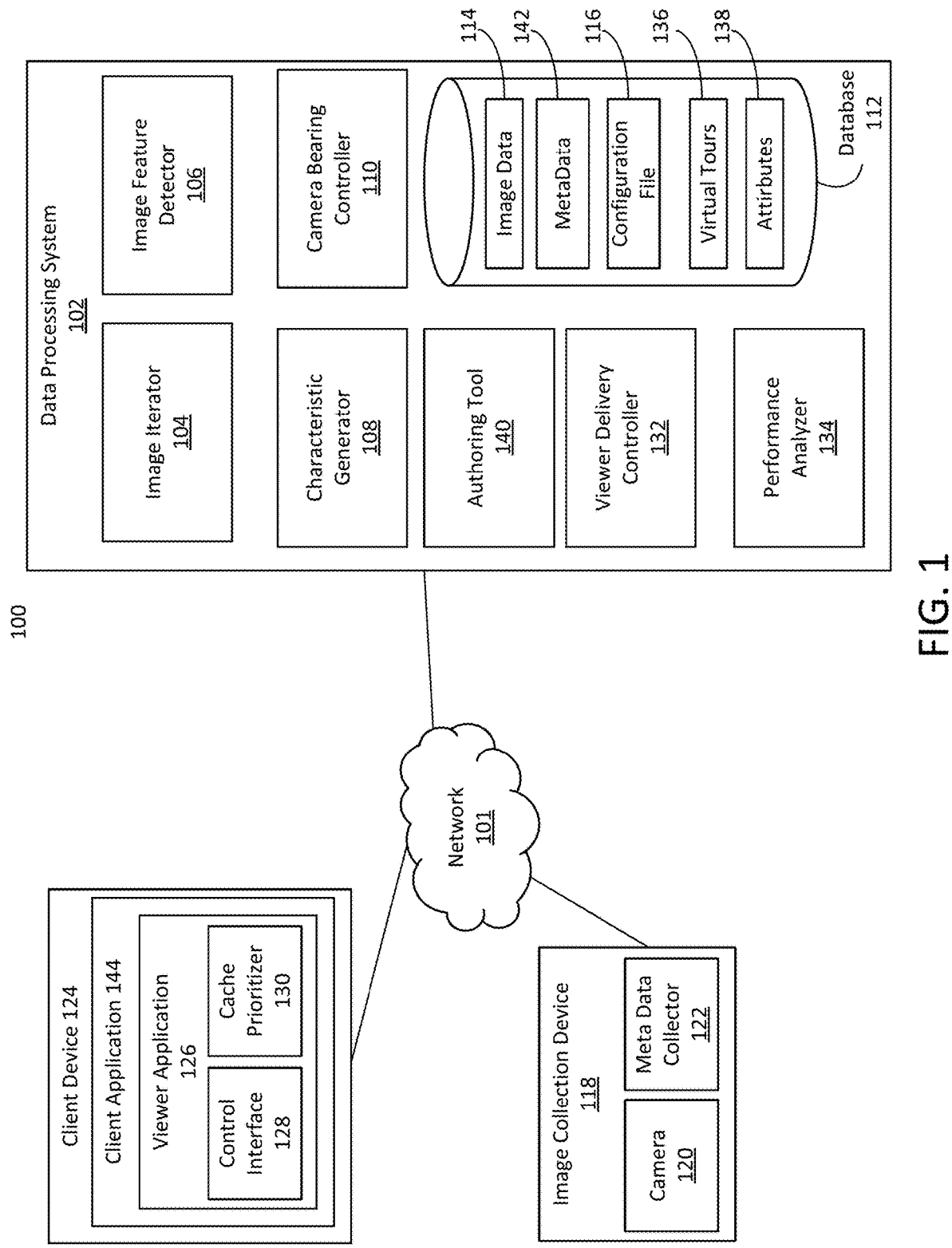
FIG. 1 depicts a block diagram of an illustrative system for connecting panoramic images to generate virtual tours, in accordance with an implementation.

Systems and methods of this technical solution are generally directed to automatically connecting panoramic images. This technical solution can automatically associate a visual position and direction between correlative panoramic images or video media to generate a smooth, seamless camera path between the different panoramic images. The technical solution can use the generated camera path to generate a virtual tour. Thus, this technical solution can connect independent panoramic images (or video media) into a cohesive experience that is based on a cohesive set of rules.

To do so, the data processing system of this technical solution can receive independent panoramic images or video from a client device. The data processing system can user iteration to surface key datasets from image-level noise, and create a directional connection between the panoramic images. The data processing system can be configured with a feature detection technique to facilitate generating the virtual tours. The data processing system can be configured with one or more feature detection technique, including, for example, a scale-invariant feature transform ("SIFT"), speeded up robust features ("SURF"), AKAZE, or BRISK. The data processing system can use a combination of octave and octave layers, scale factor, sigma values, and feature limiters to extract the target datasets.

To facilitate generating virtual tours, the data processing system can explicitly control and persist digital camera position to connect a set of panoramic images. The data processing system can register, visually associate, and persist the order of a set of panoramic media so as to create a virtual tour.

The data processing system can further automatically generate characteristics for the virtual tour. For example, the data processing system can provide a linear directional method that constraints the virtual tour camera path to forwards and backwards. The data processing system can provide an animation where each step through a sequence can begin with an automated camera pan—on one or both sides. The data processing system can provide an interruptible interactive experience, such as the ability to lean-back or lean-forward. As part of the transition, the data processing system can provide a method for camera control editing camera position.

The data processing system can provide a method for establishing key camera pose or bearing for the sake of panoramic connection. To do so, the data processing system can determine the pose or bearing of cameras given current registration as seen by another image. The data processing system can use the bearing information to author the direction of travel. To determine the bearings, the data processing system can be configured with a pose extraction technique. The pose extraction technique can include or be based on an comparing or fading two images, and identifying or finding the camera position based on the second image. The data processing system can perform pose extraction by handling spherical or epipolar geometry, in addition to flat images, and can provide fully-automated direct connection (automated).

Thus, the data processing system of this technical solution can establish a balance between automatic playback and interruptability of a virtual tour that is constrained to forwards/backwards movement without any branching. The data processing system can automatically connect panoramic images and can prioritize the camera path in order to generate the virtual tour with a fixed speed (e.g., 3 seconds per image). The data processing system can be configured with a machine learning technique to automatically align images. At connection time, the data processing system can provide an option to change path or pan to render another frame. For example, the data processing system can generate the virtual tour with a camera path that can automatically turn left or right. The data processing system can automatically generate characteristics for inclusion in the virtual tour, including, for example, chevrons or other icons that indicate directionality or interactivity. The chevron-style control provided by the data processing system can move the virtual tour in a linear direction, such as uniquely back and forth, through the tour.

For example, the data processing system can deliver a viewer application for rendering in a client application (e.g., a web browser) on a client device (e.g., laptop computing device, tablet computing device, smartphone, etc.). The data processing system can provide the viewer application responsive to a request or call from the client device. The data processing system can stream content that includes the panoramic images and metadata on the panoramic images. The viewer application executing on the client device can automatically initiate playback of the virtual tour upon receipt of the streamlining content, and provide a control interface for the user to control certain aspects of the virtual tour during playback.

FIG. 1 depicts a block diagram of an illustrative system for connecting images to generate a virtual tour, in accordance with an implementation. The system 100 can include a data processing system 102 designed, constructed and operational to receive images, process the images, and connect the images to generate a virtual tour. The data processing system 102 can include one or more processors, servers, or other hardware components depicted in FIG. 3. The data processing system 102 can include at least one image iterator 104. The data processing system 102 can include at least one image feature detector 106. The data processing system 102 can include at least one characteristic generator 108. The data processing system 102 can include at least one camera bearing controller 110. The data processing system 102 can include at least one viewer delivery controller 132. The data processing system 102 can include at least one performance analyzer 134. The data processing system can include at least one authoring tool 140. The data processing system 102 can include at least one database 112. The database 112 can store image data 114 and a configuration file 116. The database 112 can include or store metadata 142 associated with the image data 114, or virtual tours. The database 112 can include or store virtual tours 136 generated by the data processing system 102. The database 112 can include or store attributes 138. The data processing system 102 can interface or communicate with at least one image collection device 118 via a network 101. The image collection device 118 can include at least one camera 120 and at least one meta data collector 122. The image collection device 118 can transmit images obtained via the camera 120 to the data processing system 102 via network 101. The image collection device 118 can obtain meta data such as location information, camera sensor information, position information, gyroscope information, or other information associated with a location and provide the information as metadata to the data processing system 102.

One or more of the image iterator 104, image feature detector 106, characteristic generator 108, camera bearing controller 110, authoring tool 140, viewer delivery controller 132, or performance analyzer 134 can include one or more processors, logic, rules, software or hardware. One or more of the image iterator 104, image feature detector 106, characteristic generator 108, camera bearing controller 110, authoring tool 140, viewer delivery controller 132, or performance analyzer 134 can communicate or interface with one or more of the other component of the data processing system 102 or system 100.

Still referring to FIG. 1, and in further detail, the data processing system 102 can include an image iterator 104 designed, constructed and operational to surface key data sets from image-level noise. The image iterator 104 can be configured with one or more techniques to identify key data sets from the image-level noise. The image iterator 104, using these techniques, can create a directional connection between the images. For example, the image iterator 104 can access image data 114 stored in database 114, process the images to remove image-level noise, and then determine a directional connection between the images. A directional connection can refer to a camera path or transition from a first image to a second image. The image iterator 104 can control and persist a digital camera position through the panoramic connection set.

The image iterator 104 can establish, set, generate or otherwise provide image transitions for the virtual tour. The data processing system can build visual image transitions during the creation of the virtual tour. To do so, the data processing system 102 can use a tweened animation curve. A tweened animation curve can include generating intermediate frames between two frames in order to create the illusion of movement by smoothly transitioning one image to another. The data processing system 102 can use the tweened animation curve to increase or maximize the sense of forward motion between images, relative to not using tweened animations.

The image iterator 104 can perform tweening in a manner that preserves the spatial orientation. For example, the data processing system 102 can position a virtual camera at an entrance of a cube, such as a second cube. The data processing system 102 can move a previous scene forwards and past the viewer while fading out, and move the second scene in (e.g., overlapping) while fading in. This overlap can correspond to, refer to, represent, or symbolize linear editing techniques. For a door transition, the data processing system 102 can fade the door as the viewer passes through the door.

The data processing system 102 can include an image feature detector 106 designed, constructed and operational to identify features from the images or sequence of the images. The feature detector can be configured with various feature detection techniques, including, for example, one or more of SIFT, SURF, AKAZE, and BRISK. The feature detector 106 can use a combination of octave and octave layers, scale factors, sigma values, and feature limiters to extract the target data sets. For example, the feature detector 106 can receive the key data sets surfaced from image-level noise by the image iterator 104, and then detect features in the key data sets.

The image feature detector 106 can perform image processing on the images to identify features or objects. For example, the image feature detector 106 can detect doors. The data processing system 102 can cast rays to corner points of the door and determine which faces are identified or hit. Since door images can be spread on up to four different cub faces, for example, the data processing system 102 casts the rays to the corner points to identify which faces are hit. The data processing system 102 can then dynamically create an alpha mask in a canvas based on those coordinates. The data processing system 102 can apply this alpha mask to the texture of the cube faces. In some cases, the data processing system 102 can initiate binary searching along the distance between dots, and draw lines to the edge of the face for as many faces involved as necessary. Upon identifying the doors, the data processing system 102 can provide animations for the outline of the door. The data processing system 102 can provide a set of sprites, such as a computer graphic that can be moved on-screen or otherwise manipulated as a single entity. The data processing system 102 can provide the set of sprites around the door outline to form the frame of the door. The data processing system 102 can scale the animation logic in size or opacity.

The data processing system 102 can include a camera bearing controller 110 designed, constructed and operational to establish a camera pose or bearing to facilitate panoramic connection. The camera bearing controller 110 can determine the camera bearing or pose given a current registration as indicated by another image. The camera bearing controller 110 can be configured with a pose extraction technique that can compare two subsequent images to identify the camera position for the first image based on the subsequent image. The camera bearing controller 110 can be configured with a panoramic image function that can process spherical or epipolar geometry of the images.

The data processing system 102 can include characteristic generator 108 designed, constructed and operational to automatically generate characteristics for the connected set of images and for inclusion in the virtual tour. The characteristic generator 108 can use the features detected by the feature detector 106 to generate a virtual tour with an animation that steps through the sequence of images to provide a linear direction. The data processing system 102 can store the generator virtual tour in virtual tour database 136. The virtual tour stored in the database 112 can be referred to as virtual tour 136. The characteristic generator 108 can initialize the virtual tour with an automated camera pan at one or more sides. The characteristic generator 108 can identify a direction of the camera path and generate chevrons or other icons to embed of overlay on the camera path in the virtual tour that correspond to the direction. The characteristic generator 108 can provide for interactivity with the virtual tour, such as the ability for the user to pause the virtual tour, go forwards or backwards, pan left or right, lean-back or lean forward. The characteristics can include sprites for the door frame outline, for example.

The data processing system 102 can include an authoring tool designed, constructed and operational to allow for interactive authoring, persisting, or replaying a camera position for each panoramic image. A user (e.g., a user of the image collection device 118) can interface with the authoring tool 140 via a graphical user interface. The data processing system 102, or authoring tool 140, can provide a graphical user interface accessible by the image collection device 118 or other client device 124, for example. Using the graphical user interface, a user (or content provider, or administrator) can tag hot spots in a room corresponding to the images. The user can author a separate path based on a panoramic path, create or input metadata for the panoramic path, or establish default turns. The user can provide or integrate logos into the images for presentation with the virtual tour. The logo can be integrated within the visible viewer context.

The data processing system 102 can include a viewer delivery controller 132 designed, constructed and operational to provide a virtual tour for rendering via viewer application 126 on a client device 124. The viewer delivery controller 132 can receive a request from a client device 124 for a viewer application or virtual tour. For example, a client application 144 (e.g., a web browser) executing on the client device 124 can make a call or request to the data processing system 102 for a viewer. The call can be made via JavaScript or iFrame to the data processing system 102. The viewer delivery controller 132 can receive the JavaScript or iFrame call or request. The viewer delivery controller 132 can provide the viewer application 126 to the client device 124. The viewer delivery controller 132 can provide the viewer application 126 responsive to the request or call received from the client device 124 via the network 101.

The viewer delivery controller 132 can provide the virtual tour 136 to the viewer application 126 for playback on the client application 144 or client device 124. The virtual tour 136 can include or be based on the image data 114 or metadata 142. The viewer application 126 executing on the client device can download the virtual tour 136 or other panoramic image data for playback or rendering on the client device 124.

The data processing system 102 can include a performance analyzer 134 designed, constructed and operational to measure engagement and usage of the transmitted virtual tour 136 by the user of the client device 124. The engagement with the virtual tour can include amount and types of interactions with the virtual tour or viewer application 126, the duration of interaction or engagement, the number of unique views of the virtual tour, whether the user completed watching the virtual tour, or total playback time. The viewer application 126 can provide performance metrics or attributes for storage in the attribute data structure 138. The viewer application can include a unique identifier associated with the client device 124 to allow the performance analyzer 134 to determine the number of unique views.

The system 100 can include, interface with or otherwise communicate with a client device 124. The client device 124 can include one or more component or functionality depicted in FIG. 3. The client device 124 can execute, host, or run a client application 144. The client application 144 can include a native browser, web browser, or other application capable of or configured to access a website, domain, or other resource hosted or provided by a server, such as data processing system 102. The client application 144 can include or be configured to process one or more network protocols in one or more programming languages. For example, the client application 144 can parse or process hypertext markup language (HTML), javascript, or other scripts.

The client application 144 can navigate to or access a reference, address, or uniform resource locator. The client application 144 can render HTML associated with the URL. The client application 144 can trigger a call associated with the URL. For example, the viewer application 126, upon a page refresh, can make a call via javascript or iFrame to the data processing system 102. Responsive to the call, the client application 144 can download the viewer application 126. The data processing system 102 (e.g., via the delivery controller 132) can provide the viewer application 126 to the client application 144.

The viewer application 126 can be presented or provided within the client application 144. The viewer application 126 can be presented on the client device 124 within an iFrame or portion of the client application 144. In some cases, the viewer application 126 can be presented in a separate window or pop-up on the client device 124. In some cases, the viewer application 126 can open as a separate, native application executing on the client device 124 that is separate from the client application 144.

The client device 124 can launch, invoke, or otherwise present the viewer application 126 responsive to downloading the viewer application from the data processing system 102. The client device 124, or viewer application 126, can download the content stream including metadata for the content stream. For example, the viewer application 126 can download the virtual tour 136 from the data processing system 102. the viewer delivery controller 132 can provide the virtual tour 136 to the viewer application. The virtual delivery controller 132 can select the virtual tour 136 associated with the reference, URL, or other address input into the viewer application 126 or the client application 144. For example, when a user navigates to a resource via the client application 144, the client application 144 can make a call for the viewer application 126. The call for the viewer application can include an identifier of the virtual tour that has been established or pre-selected for the resource. In some cases, the viewer application 126 can present an indication of the virtual tours that are available for the website, and receive a selection of the virtual tour from the user.

The viewer application 126 can present a control interface 128 designed, constructed and operational to provide user interface elements. The control interface 128 can provide buttons, widgets, or other user interface elements. The control interface 128 can receive input from a user of the client device 124. The control interface 128 can provide the ability to control playback of the virtual tour. The control interface 128 can provide a playback button or other buttons that can control one or more aspects of the virtual tour.

In some cases, the control interface 128 can receive mouse down interactivity outside the frame of the client application 144 in which the viewer application 126 is presenting the virtual tour. For example, the control interface 128 can provide continuing user control of camera position in the virtual tour when moving the mouse outside the viewer application 126 showing the virtual tour.

Figure 2A:
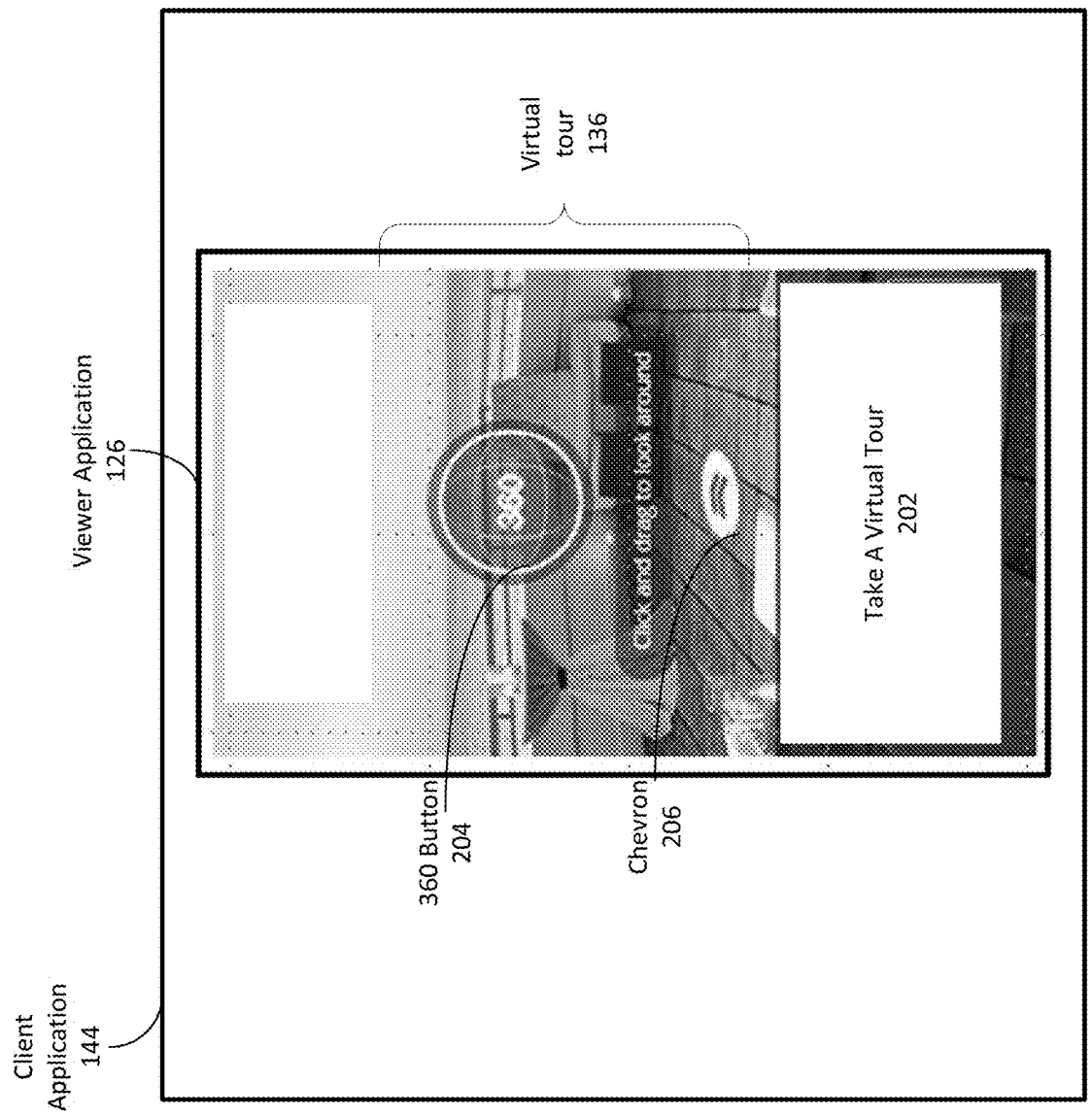
FIGS. 2A-2E depict illustrations of predetermined virtual tours generated by a data processing system, in accordance with implementations.
Figure 2B:
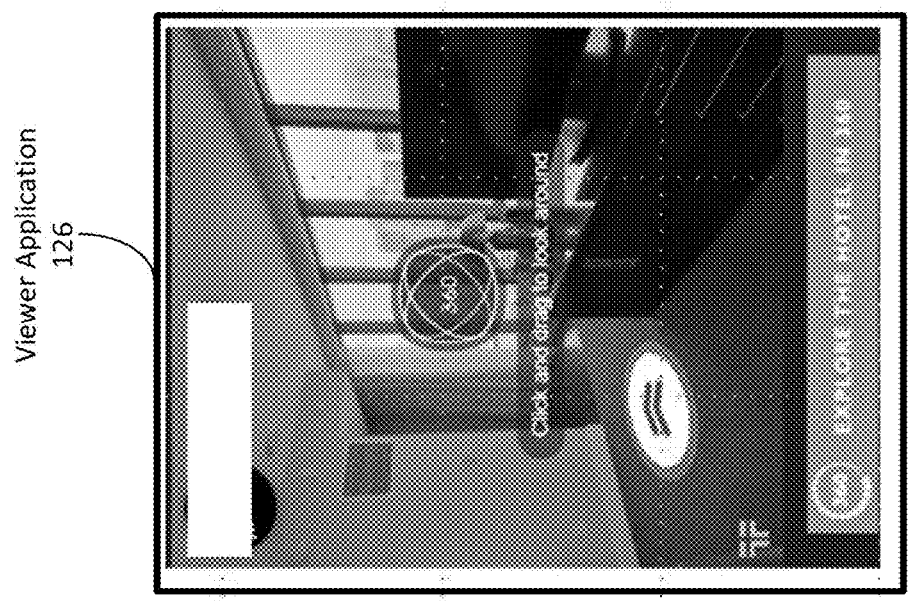
Figure 2C:
Figure 2D:
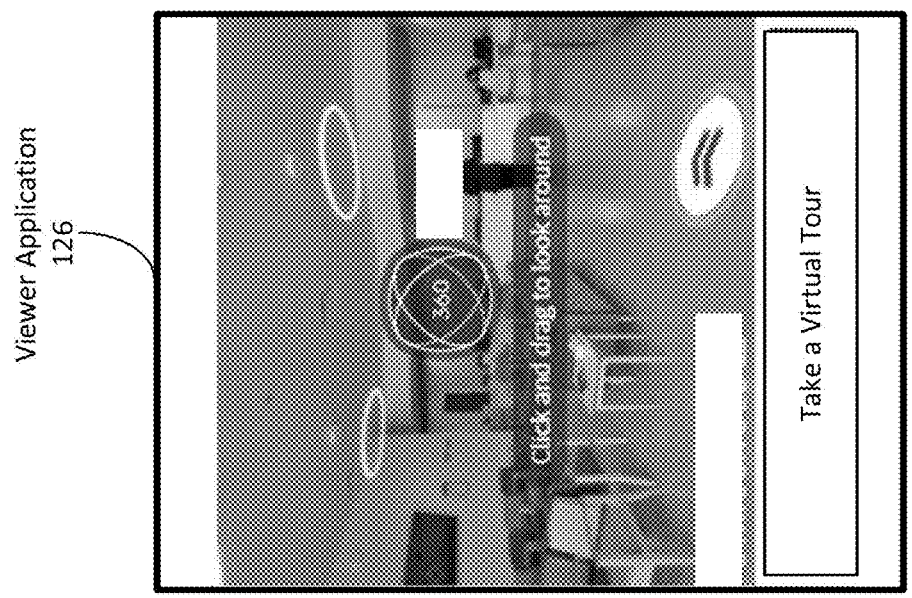
Figure 2E:
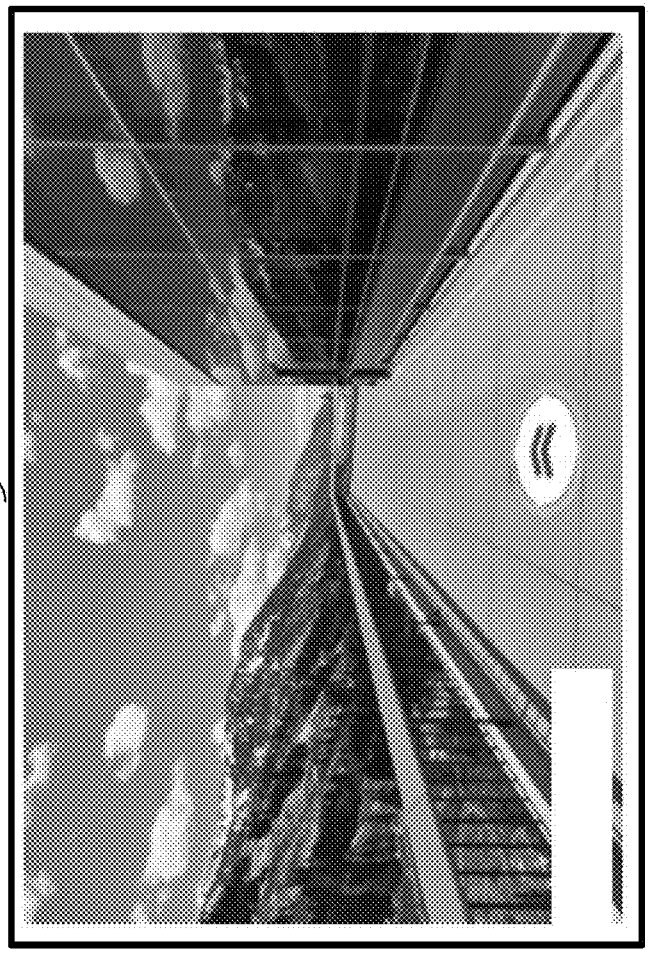

For example, the control interface 128 can include buttons 202, 204 and 206 depicted in FIG. 2A. The "take a virtual tour" button 202 can be a play button that initiates playback of the virtual tour. In some cases, the virtual tour 136 can be configured to automatically playback once downloaded by the viewer application. The 360 button 204 can allow a user to view the area surrounding the location in the virtual tour. The 360 button 204 allows the user to pan around the area in 360 degrees. The 360 button 204 can be configured for persistent mouse control such that the user can continue to pan around the location in the virtual tour even if the mouse pointer moves off of the viewer application 126 and into other portions of the client application 144 outside the frame in which the viewer application 126 is presented. The control interface 128 can provide for follow-on connections. Follow-on connections can include an interactive element in the control interface 128 that allows for user control for forward and reverse motion through the panoramic sequence.

To facilitate a smooth, seamless playback of the virtual tour, the viewer application 126 can include a cache prioritizer 130 designed, configured and operational to automatically download elements of the virtual tour. The cache prioritizer 130 can be configured with a function or algorithm for progressive caching. Using the function, the cache prioritizer 130 can automatically download higher priority elements first or ahead of lower priority elements in the virtual tour. For example, higher priority elements can include immediately-visible images, followed by $2^{nd}$-tier (or lower priority) content, such as subsequent images or other characteristics.

The cache prioritizer 130 can be configured to select a prioritization function or algorithm based on the type of virtual tour, type of client device 124, available bandwidth associated with network 101, size of the images or virtual tour, speed of the playback, a subscription plan associated with the provider of the virtual tour, or other attributes. In some cases, the cache prioritizer 130 can adjust the priority of elements based on historical feedback or performance attributes.

FIGS. 2A-2E depict illustrations of predetermined virtual tours, in accordance with implementations. The virtual tours can be generated by the data processing system depicted in FIG. 1. The virtual tour can include automatically generated characteristics, such as chevrons, icons and interactive features. The data processing system can generate the virtual tour to allow a user to click and drag to look around or pan around the virtual tour. The data processing system can generate the virtual tour to include chevrons or strike points that provide a predetermined path.

For example, virtual tour as shown in FIGS. 2A-2E can have limited features or functions to improve efficiency of delivery, while increasing engagement and improving user experience. The user can control the experience by controlling the virtual tour. The virtual tour can include an interactivity feature generated by the data processing system 102 that can allow a user to click and drag to look around the image. The data processing system can generate chevrons or icons for the virtual tour that indicate a direction of the camera path.

Figure 3:
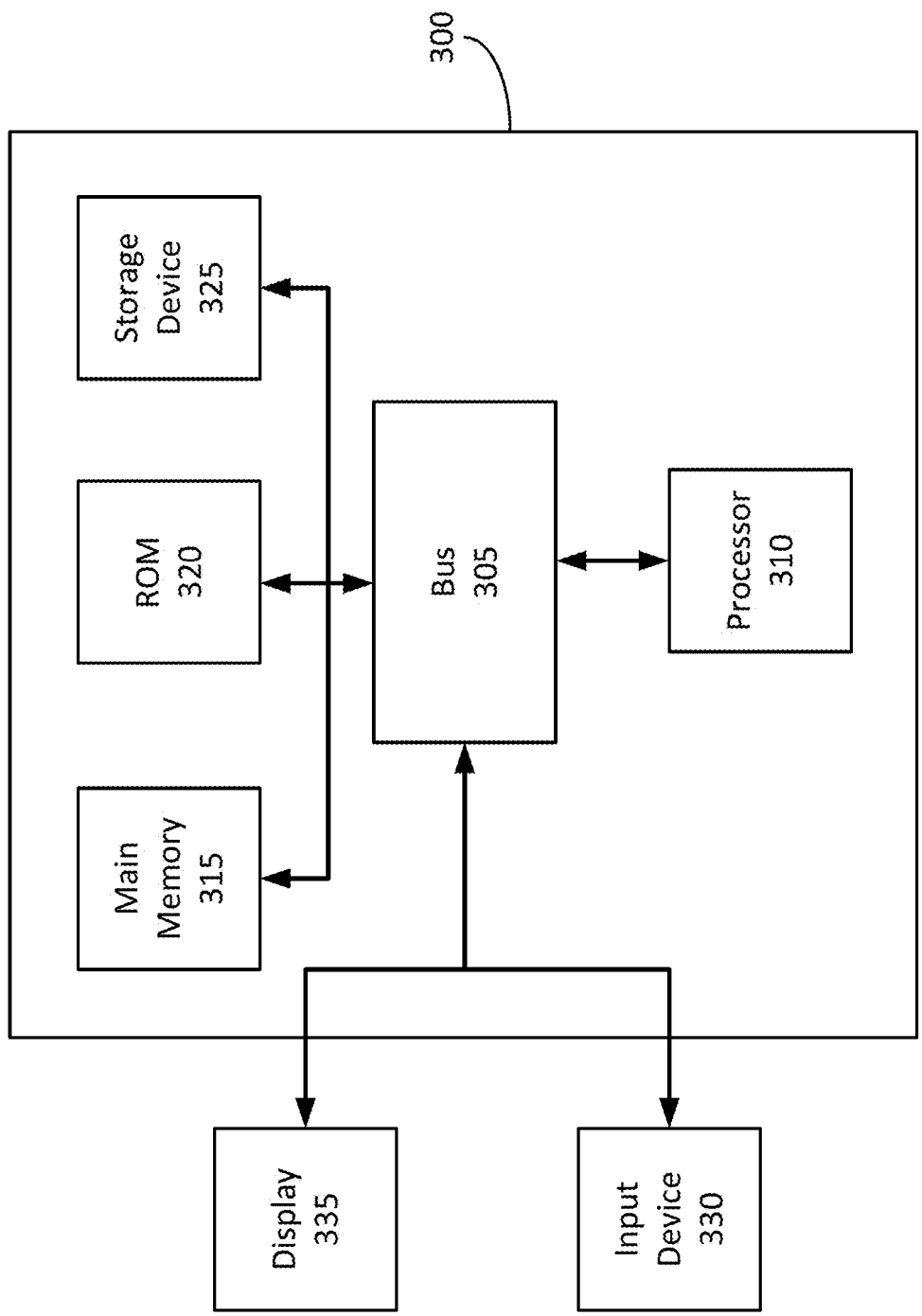
FIG. 3 is a block diagram illustrating an architecture for a computer system that can be employed to implement elements of the systems, flows and methods described and illustrated herein.

FIG. 3 is a block diagram of an example computer system 300 that can be used to implement or perform one or more functionality or element of this technical solution. The computer system or computing device 300 can include or be used to implement the data processing system 102, or its components such as the data processing system 102. The computing system 300 includes at least one bus 305 or other communication component for communicating information and at least one processor 310 or processing circuit coupled to the bus 305 for processing information. The computing system 100 can also include one or more processors 310 or processing circuits coupled to the bus for processing information. The computing system 100 also includes at least one main memory 315, such as a random access memory (RAM) or other dynamic storage device, coupled to the bus 305 for storing information, and instructions to be executed by the processor 310. The main memory 315 can be or include the memory 112. The main memory 315 can also be used for storing virtual machine information, hardware configuration information of the virtual machine, software configuration information of the virtual machine, IP addresses associated with the virtual machine or other information during execution of instructions by the processor 310. The computing system 100 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions. The storage device 325 can include or be part of the memory 112.

The computing system 100 may be coupled via the bus 305 to a display 335, such as a liquid crystal display, or active matrix display, for displaying information to a user. An input device 330, such as a keyboard or voice interface may be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335. The display 335 can be part of the data processing system 102, or other component of FIG. 1.

The processes, systems and methods described herein can be implemented by the computing system 100 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 100 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Figure 4:
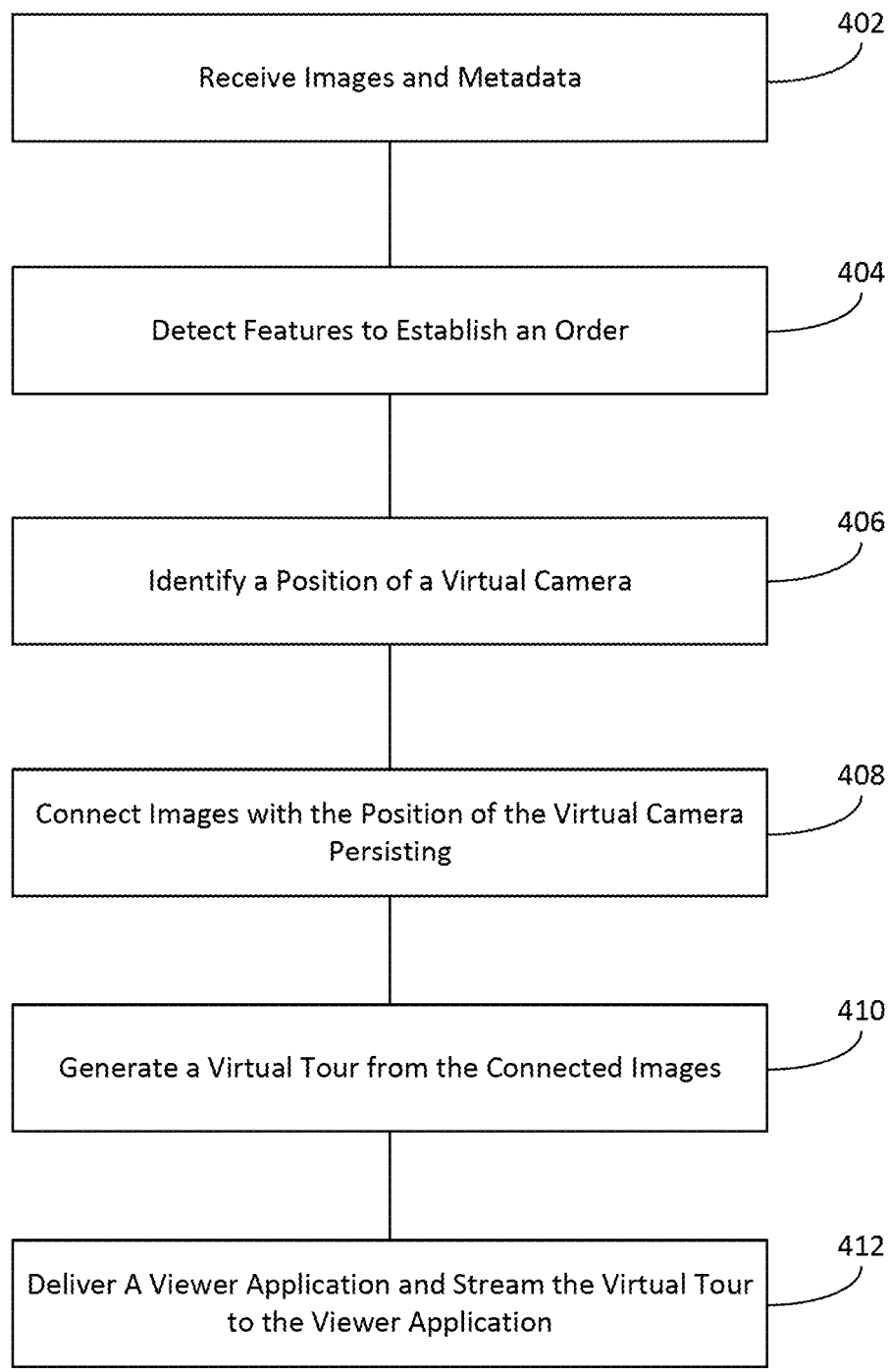
FIG. 4 depicts a flow diagram of an illustrative method for connecting panoramic images to generate virtual tours, in accordance with an implementation.

FIG. 4 is depicts a flow diagram of an illustrative method for connecting panoramic images to generate virtual tours. The method 400 can be performed by one or more system or component depicted in FIG. 1, including, for example a data processing system. In brief overview, the method 400 can include the data processing system receiving a plurality of images and metadata captured by a first client device at ACT 402. At ACT 404, the method 400 can include the data processing system detecting one or more features of the plurality of images to establish an order between the plurality of images. At ACT 406, the method 400 can include the data processing system identifying, based at least in part on the plurality of images and the metadata, a position for a virtual camera. At ACT 408, the method 400 can include the data processing system connecting, in the order, the plurality of images with the position of the virtual camera persisting across the plurality of images. At ACT 410, the method 400 can include the data processing system generating a virtual tour from the connected plurality of images with a linear path along the persistent position of the virtual camera based on a configuration file comprising a constraint configured to disable branching along the linear path. At ACT 412, the method 400 can include the data processing system delivering a viewer application and streaming, to the viewer application, the virtual tour.

Still referring to FIG. 4, and in further detail, the method 400 can include the data processing system receiving a plurality of images and metadata captured by a first client device at ACT 402. For example, the first client device can include a camera that can take or capture images. A user can take images of a physical location using the first client device. The first client device can include various sensors that can collect or record metadata associated with capturing the images. For example, the metadata can include timestamps, location information (e.g., GPS, lat/long, address), compass or direction measurements, ambient light conditions, motion information (e.g., IMU or accelerometer information), etc. The images can be panoramic images with a field of view that is greater than or equal to 140 degrees, 150 degrees, 160 degrees or other field of view. The images can be independent from one another in that the first client device can take images of different locations within a physical building and in a different order. For example, the first client device can take images of various locations within the physical location in various angles or perspectives and at different times. The images may not be taken continuously (e.g., discontinuously or independently) in a video manner, in some cases. The data processing system can receive the images in real-time, in a batch mode, or periodically based on a time interval. In some cases, the first client device can push the images to the data processing system.

At ACT 404, the method 400 can include the data processing system detecting one or more features of the plurality of images to establish an order between the plurality of images. The data processing system can detect the one or more features based at least one of a scale-invariant feature transform ("SIFT"), speeded up robust features ("SURF"), AKAZE, or BRISK. The data processing system can use a combination of octave and octave layers, scale factors, sigma values, and feature limiters to extract the target data sets. For example, the data processing system can receive the key data sets surfaced from image-level noise and then detect features in the key data sets. The data processing system can perform image processing on the images to identify features or objects. For example, the data processing system can detect doors, cast rays to corner points of the door and determine which faces are identified or hit.

The data processing system can iterate through the plurality of images to surface datasets from image-level noise. The data processing system can generate intermediate frames between at least two surfaced datasets corresponding to at least two of the plurality of images using a tweened animation curve configured to preserve spatial orientation relative to a virtual camera. The data processing system can generate the virtual tour comprising the intermediate frames configured to provide smooth transitioning across the virtual tour.

At ACT 406, the method 400 can include the data processing system identifying, based at least in part on the plurality of images and the metadata, a position for a virtual camera. For example, the data processing system can position a virtual camera at an entrance of a cube, such as a second cube. The data processing system can move a previous scene forwards and past the viewer while fading out, and move the second scene in (e.g., overlapping) while fading in. This overlap can correspond to, refer to, represent, or symbolize linear editing techniques. For a door transition, the data processing system can fade the door as the viewer passes through the door.

At ACT 408, the method 400 can include the data processing system connecting, in the order, the plurality of images with the position of the virtual camera persisting across the plurality of images. The data processing system can persist or replay a camera position for each panoramic image. For example, the data processing system can connect the panoramic images such that it appears that the position of a camera that captured the panoramic images has been steady, consistent, or otherwise persistent. The view or perspective of the images can be steady, consistent or persistent from one frame to the other such that, regardless of whether or not the images were captured in order or sequentially or continuously, the data processing system can connect the panoramic images to create or construct a seamless, smooth transition from frame to frame with a smooth, persistent virtual camera position. Virtual position can refer to a perspective from which the virtual tour is played regardless of whether the actual panoramic images were captured from that particular perspective For example, the data processing system can detect a bearing of a first image of the plurality of images based on a registration as identified by a second image of the plurality of images. The data processing system can establish a direction of travel along the linear path for the virtual tour based on the bearing. The data processing system can determine the bearing based on the second image via a pose extraction technique configured to fade the first image with the second image.

At ACT 410, the method 400 can include the data processing system generating a virtual tour from the connected plurality of images with a linear path along the persistent position of the virtual camera based on a configuration file comprising a constraint configured to disable branching along the linear path. The data processing system can be configured with technical rules and logic to provide bidirectional camera movement with specific constraints that allow for only forwards or backwards movement along the camera path (e.g., a linear path), thereby disabling branching off the camera path. By disabling or preventing branching along the camera path, the system can reduce excess computing resource utilization, while providing a smooth transition between panoramic images (or video) during the virtual tour. The data processing system can generate the virtual tour with a constant speed of playback based on a parameter in the configuration file.

At ACT 412, the method 400 can include the data processing system delivering a viewer application and streaming, to the viewer application, the virtual tour. The data processing system can configure the viewer application to detect input via a user interface of the second client device to adjust playback of the virtual tour. For example, the viewer application can include a user interface or graphical user interface. The viewer application can detect mouse click, gestures, or other inputs via a user interface of the client device. The viewer application can be configured to prevent, based on the constraint, the input from adjusting playback of the virtual tour.

The data processing system can configure the viewer application to detect a request received via a user interface of the second client device to pause playback of the virtual tour. The viewer application can initiate, responsive to the request, a countdown timer for a predetermined time interval established in the configuration file. The viewer application can resume playback of the virtual tour responsive to expiration of the countdown timer.

The data processing system can receive requests or information or interactions from the viewer application. For example, the data processing system can receive, from the viewer application, a request to pause playback of the virtual tour. The data processing system can further receive a request or indication to provide a 360 degree scene. The data processing system can identify frames or images associated with the location at which the virtual tour was paused in order to identify the additional frames or images that provide a 360 scene. The data processing system can connect those additional images and stream the images to the viewer application in order to present the 360 degree scene.

Upon receiving the indication to pause playback, the viewer application can automatically begin or initiate a countdown timer. The viewer application can set the timer to a predetermined time interval, such as 3 seconds, 4 seconds, 5 seconds or other time interval. If the viewer application does not receive any interaction from the user interface for the duration of the predetermined time interval, then the viewer application can automatically resume the playback of the virtual tour from the paused location. However, if the user interacts with the viewer application during the predetermined time interval, then the viewer application can reset the time interval without resuming playback (e.g., keep the virtual tour paused).

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system, comprising:
a data processing system comprising one or more processors and memory to:
receive a plurality of images and metadata captured by a first client device;
detect one or more features of the plurality of images to establish an order between the plurality of images;
identify, based at least in part on the plurality of images and the metadata, a position for a virtual camera;
connect, in the order, the plurality of images with the position of the virtual camera persisting across the plurality of images;
generate a virtual tour from the connected plurality of images with a linear path along the persistent position of the virtual camera based on a configuration file comprising a constraint configured to disable branching along the linear path;
deliver, responsive to a request from a second client device different from the first client device, a viewer application that executes in a client application on the second client device;
stream, to the viewer application, the virtual tour based at least in part on the configuration file to cause the viewer application to automatically initiate playback of the virtual tour upon receipt of the streamed virtual tour;
receive, from the viewer application, a request to pause playback of the virtual tour and provide a 360 degree scene, wherein the request to pause playback initiates a countdown timer for a predetermined time interval; and
provide, to the viewer application responsive to the request, one or more images to provide the 360 degree scene, wherein the viewer application automatically resumes playback of the virtual tour responsive to expiration of the countdown timer.

2. The system of claim 1, wherein the plurality of images are panoramic images with a field of view greater than or equal to 160 degrees.

3. The system of claim 1, wherein the data processing system is further configured to:
iterate through the plurality of images to separate datasets from image-level noise;
generate intermediate frames between at least two surfaced datasets corresponding to at least two of the plurality of images using a tweened animation curve configured to preserve spatial orientation relative to a virtual camera; and
generate the virtual tour comprising the intermediate frames configured to provide smooth transitioning across the virtual tour.

4. The system of claim 1, wherein the data processing system is further configured to:
detect the one or more features based at least one of a scale-invariant feature transform ("SIFT"), speeded up robust features ("SURF"), AKAZE, or BRISK.

5. The system of claim 1, wherein the data processing system is further configured to:
detect a bearing of a first image of the plurality of images based on a registration as identified by a second image of the plurality of images; and
establish a direction of travel along the linear path for the virtual tour based on the bearing.

6. The system of claim 5, wherein the data processing system is further configured to:
determine the bearing based on the second image via a pose extraction technique configured to fade the first image with the second image.

7. The system of claim 1, wherein the data processing system is further configured to:

generate the virtual tour with a constant speed of playback based on a parameter in the configuration file.

8. The system of claim 1, wherein the data processing system is further configured to:
configure the viewer application to:
detect input via a user interface of the second client device to adjust playback of the virtual tour; and
prevent, based on the constraint, the input from adjusting playback of the virtual tour.

9. The system of claim 1, wherein the data processing system is further configured to:
configure the viewer application to:
detect a request received via a user interface of the second client device to pause playback of the virtual tour;
initiate, responsive to the request, a countdown timer for a predetermined time interval established in the configuration file; and
resume playback of the virtual tour responsive to expiration of the countdown timer.

10. A method, comprising:
receiving, by a data processing system comprising one or more processors and memory, a plurality of images and metadata captured by a first client device;
detecting, by the data processing system, one or more features of the plurality of images to establish an order between the plurality of images;
identifying, by the data processing system based at least in part on the plurality of images and the metadata, a position for a virtual camera;
connecting, by the data processing system in the order, the plurality of images with the position of the virtual camera persisting across the plurality of images;
generating, by the data processing system, a virtual tour from the connected plurality of images with a linear path along the persistent position of the virtual camera based on a configuration file comprising a constraint configured to disable branching along the linear path, wherein generating the virtual tour comprises:
iterating, by the data processing system, through the plurality of images to separate datasets from image-level noise;
generating, by the data processing system, intermediate frames between at least two surfaced datasets corresponding to at least two of the plurality of images using a tweened animation curve configured to preserve spatial orientation relative to a virtual camera, wherein the virtual tour comprises the intermediate frames configured to provide smooth transitioning across the virtual tour;
delivering, by the data processing system responsive to a request from a second client device different from the first client device, a viewer application that executes in a client application on the second client device; and
streaming, by the data processing system to the viewer application, the virtual tour based at least in part on the configuration file to cause the viewer application to automatically initiate playback of the virtual tour upon receipt of the streamed virtual tour.

11. The method of claim 10, wherein the plurality of images are panoramic images with a field of view greater than or equal to 160 degrees.

12. The method of claim 10, comprising:
detecting, by the data processing system, the one or more features based at least one of a scale-invariant feature transform ("SIFT"), speeded up robust features ("SURF"), AKAZE, or BRISK.

13. The method of claim 10, comprising:
detecting, by the data processing system, a bearing of a first image of the plurality of images based on a registration as identified by a second image of the plurality of images; and
establishing, by the data processing system, a direction of travel along the linear path for the virtual tour based on the bearing.

14. The method of claim 13, comprising:
determining, by the data processing system, the bearing based on the second image via a pose extraction technique configured to fade the first image with the second image.

15. The method of claim 10, comprising:
generating, by the data processing system, the virtual tour with a constant speed of playback based on a parameter in the configuration file.

16. The method of claim 10, comprising:
providing, by the data processing system, the viewer application configured to:
detect input via a user interface of the second client device to adjust playback of the virtual tour; and
prevent, based on the constraint, the input from adjusting playback of the virtual tour.

17. The method of claim 10, comprising:
providing the viewer application configured to:
detect a request received via a user interface of the second client device to pause playback of the virtual tour;
initiate, responsive to the request, a countdown timer for a predetermined time interval established in the configuration file; and
resume playback of the virtual tour responsive to expiration of the countdown timer.

18. A non-transitory computer readable comprising processor executable instructions that, when executed by one or more processors, cause the one or more processors to:
receive a plurality of images and metadata captured by a first client device;
detect one or more features of the plurality of images to establish an order between the plurality of images;
identify, based at least in part on the plurality of images and the metadata, a position for a virtual camera;
connect, in the order, the plurality of images with the position of the virtual camera persisting across the plurality of images;
generate a virtual tour from the connected plurality of images with a linear path along the persistent position of the virtual camera based on a configuration file comprising a constraint configured to disable branching along the linear path, wherein generation of the virtual tour comprises:
iterating through the plurality of images to surface datasets from image-level noise;
generating intermediate frames between at least two surfaced datasets corresponding to at least two of the plurality of images using a tweened animation curve configured to preserve spatial orientation relative to a virtual camera, wherein the virtual tour comprises the intermediate frames configured to provide smooth transitioning across the virtual tour;
deliver, responsive to a request from a second client device different from the first client device, a viewer application that executes in a client application on the second client device; and
stream, to the viewer application, the virtual tour based at least in part on the configuration file to cause the viewer application to automatically initiate playback of the virtual tour upon receipt of the streamed virtual tour.

* * * * *